Aug. 4, 1942.  E. R. DOEPKE  2,292,107

HOUSE TRAILER

Filed Jan. 21, 1941  2 Sheets-Sheet 1

Inventor
Edward R. Doepke
By Glenn L. Fish
Attorney

Aug. 4, 1942.  E. R. DOEPKE  2,292,107
HOUSE TRAILER
Filed Jan. 21, 1941  2 Sheets-Sheet 2
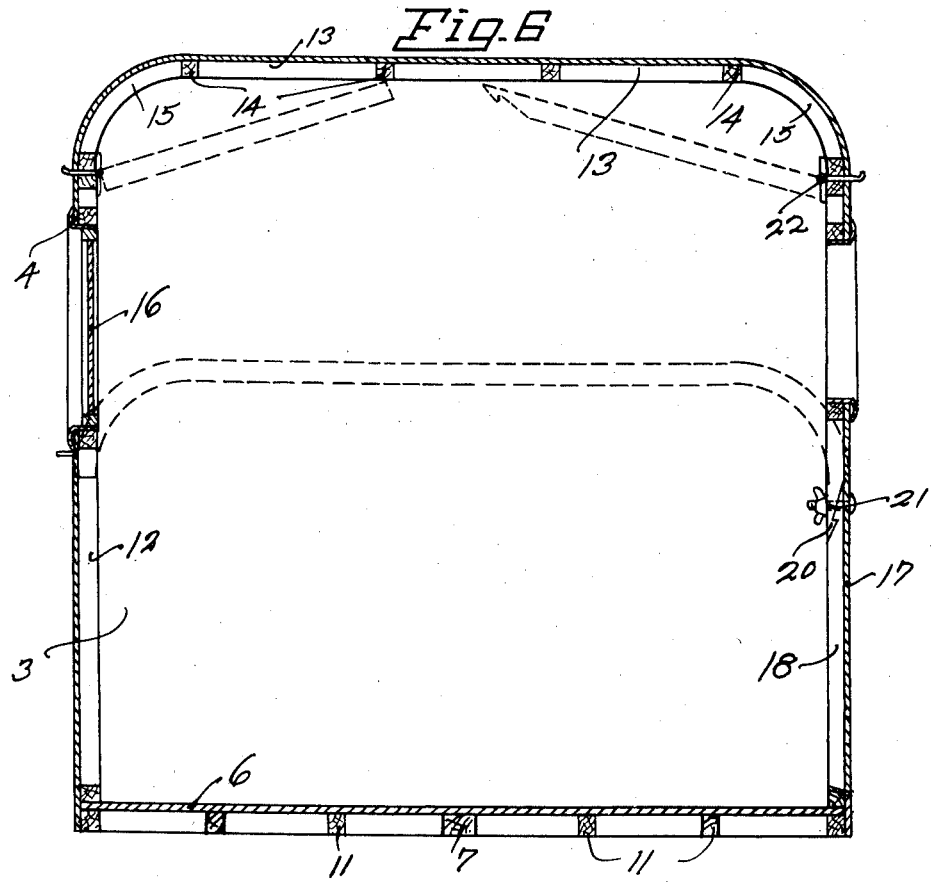
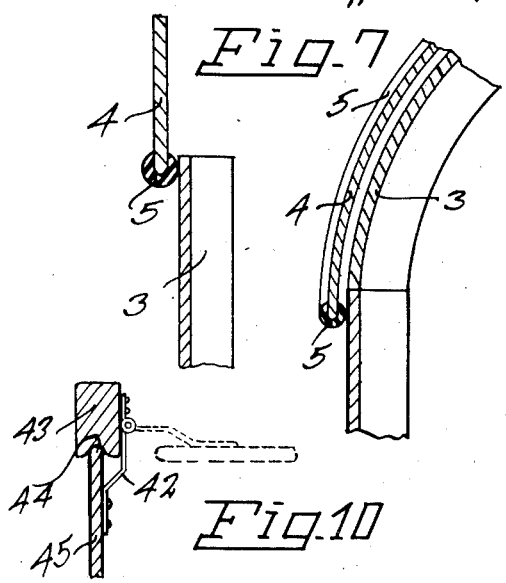
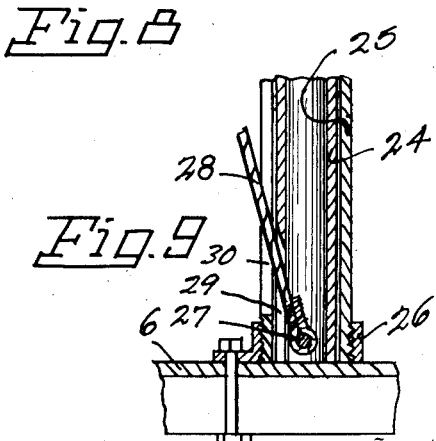
Inventor
Edward R. Doepke
By
Glenn L. Fish
Attorney Patented Aug. 4, 1942

2,292,107

UNITED STATES PATENT OFFICE 2,292,107

HOUSE TRAILER

Edward Robert Doepke, Kennewick, Wash.

Application January 21, 1941, Serial No. 375,283

2 Claims. (Cl. 296—23)

This invention relates to trailers and more particularly to a house trailer, it being one object to provide a trailer of this type having a body of such construction that it may have its upper portion shifted vertically to raised position or lowered position and thus give ample head room when the trailer is occupied as a house and also permit it to be collapsed and reduced in height so that it may be conveniently drawn along a road behind a towing vehicle from place to place.

Another object of the invention is to provide the upper portion of the trailer body with side walls so mounted that they may be folded inwardly and upwardly against the roof, where they will be out of the way when the upper portion of the body is collapsed to lowered position.

Another object of the invention is to so form the doors of the trailer body that upper and lower portions of the doors may be releasably secured to each other and very strong joints established between side posts of the two sections when the upper portion of the trailer body is in raised position.

Another object of the invention is to provide improved means for effecting raising and lowering of the upper portion of the trailer body, said means being adapted for operation by one person and so located that it will be out of the way and not be unsightly or occupy more room within the trailer body.

Another object of the invention is to so form the end portions of the upper section of the trailer body that while it may be readily shifted vertically, air will be prevented from passing between overlapping walls and the overlapped walls prevented from rattling.

Another object of the invention is to provide a trailer body which is simple in construction, easy to adjust, and not likely to easily get out of order.

The invention is illustrated in the accompanying drawings wherein:

Fig. 1 is a side elevation of the improved trailer.

Fig. 2 is a sectional view taken longitudinally through the lower portion of the trailer on the line 2—2 of Fig. 1.

Fig. 3 is a fragmentary sectional view taken transversely through the trailer on the line 3—3 of Fig. 2, with the upper section thereof in lowered position.

Fig. 4 is a sectional view taken transversely through one of the supports for the upper body section, the view being on the line 4—4 of Fig. 3.

Fig. 5 is a fragmentary view on the line 5—5 of Fig. 2.

Fig. 6 is a sectional view taken transversely through the trailer on the line 6—6 of Fig. 1.

Fig. 7 is a fragmentary sectional view taken vertically through a wall of the trailer on the line 7—7 of Fig. 1.

Fig. 8 is a similar view taken horizontally on the line 8—8 of Fig. 1.

Fig. 9 is a sectional view taken vertically through one of the supports on the line 9—9 of Fig. 4.

Fig. 10 is a fragmentary sectional view showing a hinge used for side walls of the upper body section of a square trailer.

The trailer constituting the subject matter of this invention is to be towed behind an automobile or equivalent towing vehicle and for this purpose is provided with a tow bar 1 and a suitable number of wheels 2 mounted in a conventional manner. The trailer may also be provided with an undercarriage or chassis of conventional construction which have been omitted from the drawings as they form no part of the invention.

The body of the trailer has a lower section 3 and an upper section 4 and, by referring to Figs. 1, 7 and 8, it will be seen that the upper section fits about the lower section in telescoping engagement therewith so that it may be shifted vertically from raised position to lowered position and thus reduce the height of the body by approximately one-half and permit it to be drawn along a road and under trees and other overhead obstructions which would interfere with passage of a house trailer of normal height. Lower edges of the end walls of the upper section are bound with rubber pads 5 which bear against the walls of the lower section and not only prevent the upper section from making rattling noises by striking walls of the lower section, but also serve as packing to prevent air from entering the trailer body through space between the walls of the two sections.

The floor 6 of the trailer is laid upon a foundation having a longitudinally extending bar 7 and cross bars 8 and 9, the ends of these bars being secured to a bordering frame 10 which follows the outline of the lower section of the body, the bars 8 being braced by short bars 11. There have also been provided uprights 12 to which the sheathing of the walls is secured, as shown in Fig. 2. The upper section also has a frame 13 upon which sheathing for the walls and the top is secured, and upon reference to Fig. 6, it will be seen that this frame consists of a suitable number of longitudinally extending bars 14 and cross bars 15 which are bent so that they extend downwardly at opposite sides of the upper section to serve as side bars. Windows 16 are provided at opposite sides of the upper section 4 and, at one side there has been provided a door 17 consisting of upper and lower sections having side posts 18, the door being mounted between the posts for swinging movement by hinges 19. Upper and lower sections of the side posts of the door are releasably held in engagement with each other by joints consisting of hooks 20 which interlock with each other, as shown in Fig. 6, the interlocked hooks being firmly but detachably secured to each other by bolts 21. It will be readily understood that when the upper section 4 of the body is to be lowered, the bolts will be removed to release the hooks and permit separation of the joints. Attention is also called to the fact that the side walls of the upper body section are hinged at their upper ends by hinges 22 so that these side walls may be swung inwardly and upwardly to the raised position indicated by dotted lines in Fig. 6, when the upper section is to be lowered. Hooks or other suitable securing means may be provided for holding the side walls when swung inwardly to the raised position and vertical bars for these side walls or panels may have their lower ends connected to companion bars of the lower section by joints similar to those provided for the door posts. Guides 23 are secured against outer faces of the side walls of the lower section forming receiving guides for the upper section when the upper section is lowered and thus firmly hold the two sections against vibratory movement during towing.

While it is contemplated that the upper section may be shifted vertically by hydraulic or pneumatic means, the means illustrated for accomplishing vertical shifting of the upper section and securing the same in a raised position consists of hand operated mechanism. Referring to Fig. 2, it will be seen that there have been provided a plurality of posts 24 which may be of solid or tubular formation and are secured to the walls of the upper section at opposite sides thereof, two being shown at each side of the trailer. These posts are slidably received in cylinders or tubular guides 25 which are mounted vertically at opposite sides of the lower section 3 of the trailer body, and by referring to Fig. 9, it will be seen that lower ends of the sleeves 25 are threaded into sockets 26 which are bolted to the marginal bars 10 of the foundation for the lower section. Upper ends of the posts are similarly secured by sockets 24'. Pins 27 extend diametrically through lower ends of the hollow posts and to these pins are secured ends of cables 28 which extend upwardly and outwardly through openings or slots 29 formed in lower end portions of the posts. After passing through the slots 29, the cables pass through slots 30 formed longitudinally in the sleeves 25, the full length thereof, and the cables are then carried upwardly and engaged with guide pulleys 31 mounted at upper ends of the sleeves. The cables are carried downwardly for engagement with guide pulleys 32, after which they are carried inwardly of the trailer and engaged with guide pulleys 33 carried by the cross bars 8. These pulleys are located at opposite sides of the center bar 7 which, together with the short bars 11, serve to rotatably mount a shaft 34 carrying drums 35 which are fixed to the shaft by keys 36. Each cable is secured at its end to a drum, as shown at 37 in Fig. 3, and it will be readily understood that when the shaft is turned to wind the cables on the drums, pull will be exerted to shift the posts upwardly and raise the upper section of the trailer body. The weight of the upper section 3 will carry it downwardly to lowered position when turning of the shaft and the drums in an opposite direction is permitted. The drums are tapered toward their centers so that the cables will be wound evenly thereon during turning of the shaft in a direction to exert upward movement to the posts. Turning of the shaft may be accomplished in any desired manner but in the illustration, the shaft has been shown provided with a squared end 38 and the adjacent side walls of the lower body section is formed with an opening 39 in order that a turning crank may be thrust inwardly and engaged with the squared end of the shaft. A ratchet 40 is fixed to the shaft and engaged by a pawl or dog 41 so that when the shaft is turned in the direction to raise the upper body section, it may be held against retrograde movement and the upper section held in raised position. The pawl will be swung out of engagement with the ratchet when the upper body section is to be lowered. It will thus be seen that the upper body section may be easily raised or lowered and firmly secured after being raised. Instead of hinging the walls of the upper section, as shown in Fig. 2, they may be mounted as shown in Fig. 10. In this figure, the hinges 42 are elongated and the marginal bars 43 of the top are formed with recesses 44 along their under faces to form seats in which upper edges of the walls 45 fit when in normal position. When the walls are swung inwardly and upwardly, preparatory to lowering of the upper section, they move out of the seats and assume the position indicated by dotted lines in Fig. 10.

The trailer sections as well as the doors and windows can be built with a tongue and groove connection thus preventing dust, rain and insects from penetrating the interior of the trailer.

It is further understood that the trailer may be equipped with more or less windows and screens to conform with the weather conditions. The windows may be swung outward to form awnings, or removed altogether so that the trailer can be used for a cook house or other use.

The upper section of the trailer may be telescoped on the inside, if desired, to conform with and make it possible to build the streamlined type of trailer.

When the upper section is lowered for travel, the trailer has less wind resistance, does not sway easily, and costs less to operate on the road.

Having thus described the invention, what is claimed is:

1. In a vehicle, a body having upper and lower sections provided with side and end walls, one section having telescoping engagement with the other to permit raising and lowering of the upper section, the side walls of the sections at one side of the body being formed with a door opening having side posts formed of upper and lower sections, companion upper and lower post sections having meeting end portions cut diagonally to form overlapping portions having interengaging hooks extending longitudinally of the post sections, each hook having a bill formed with a sloping inner surface and a tapered shank formed with a sloping inner surface for face to face engagement with the sloping inner surface of the bill of the companion hook when the hooks are in interlocking engagement with each other, bolts passing through the overlapped and interlocked hooks of the companion post sections to detachably hold the same in end to end engagement with each other, and a door having upper and lower sections hinged to upper and lower sections of the door post at one side of the door opening.

2. In a vehicle, a body having upper and lower sections in telescoping engagement with each other to permit raising and lowering of the upper section, tubular sleeves mounted vertically in the lower section, tubular posts mounted vertically in the upper section and slidably engaged in the sleeves, the sleeves being each formed with a longitudinally extending slot throughout its length, the posts having lower ends formed with side openings registering with the slots of the sleeves in which they fit, pins mounted through lower ends of the posts below the openings transversely of the posts and their openings, pulleys mounted externally of the sleeves at upper ends of the slots therein, cables secured to the pins and extending outwardly and upwardly through the openings and the slots of the companion sleeves and posts and engaged about the pulleys, a rotatabale shaft, and drums on the shaft having the cables wound thereon for raising the upper body section when the shaft is turned in a winding direction.

EDWARD ROBERT DOEPKE.